United States Patent [19]
Sirven

[11] 3,889,261
[45] June 10, 1975

[54] RANGE MEASUREMENT PULSE RADAR SYSTEM

[75] Inventor: Jacques Sirven, Paris, France

[73] Assignee: Thomson-CSF, Paris, France

[22] Filed: Sept. 20, 1973

[21] Appl. No.: 399,271

[30] Foreign Application Priority Data
Sept. 26, 1972 France ............................ 72.34001

[52] U.S. Cl. ...................... 343/14; 343/9; 343/17.5
[51] Int. Cl. .............................................. G01s 9/24
[58] Field of Search ............... 343/9, 12 R, 14, 17.5

[56] References Cited
UNITED STATES PATENTS

| | | | |
|---|---|---|---|
| 3,101,470 | 8/1963 | Vosburgh et al. | 343/9 |
| 3,623,096 | 11/1971 | Morris | 343/9 X |
| 3,657,738 | 4/1972 | Carpentier et al. | 343/14 X |
| 3,725,917 | 4/1973 | Sletten et al. | 343/17.5 |
| 3,750,172 | 7/1973 | Tresselt | 343/9 X |

*Primary Examiner*—T. H. Tubbesing
*Attorney, Agent, or Firm*—Cushman, Darby & Cushman

[57] ABSTRACT

A multifrequency measurement pulse radar system transmits at least two series of pulses of a same repetition frequency but of different carrier frequencies. The reflected signals are demodulated by a single reference signal and filtered in at least one Doppler filter bank. Each object of the space is characterized by at least two signals, which are picked off separately at the corresponding outputs of the Doppler filters. These signals are compared in pairs in a phase comparator which delivers the range data.

8 Claims, 4 Drawing Figures

FIG. 3

RANGE MEASUREMENT PULSE RADAR SYSTEM

BACKGROUND OF THE INVENTION

1. Field of the Invention

The present invention relates to range measurement pulse radar systems. It relates more particularly to systems which, to measure the range of a detected object, modulate the transmitted signal, and observe the phase-shift in the modulation of the received echo signal. The invention is concerned with measuring the range of terrestial, airborne or space objects, by means of ground installations or airborne systems.

2. Description of the Prior Art

Generally speaking, the determination of the range of an object by a pulse radar system, is based upon the measurement of the time interval separating the instant of emission of a pulse and the instant of its return after reflection from the object. If this time interval is in excess of the pulse recurrence periodicity, the range measurement is no longer valid and it is said that there is range ambiguity.

To overcome these drawbacks, certain known systems utilise several pulse repetition frequencies on different carrier frequencies, or pulses of variable repetition rate, or, again, recurrent pulses whose carrier frequency is linearly or sinusoidally modulated. These systems are compared in Merrill J. Skolnick's Radar Handbook published in 1970 by McGraw Hill Book company pages 19–13 and 19–17, under the heading of "Range-Ambiguity Resolution". A common drawback to all these systems is that fresh ambiguities arise when numerous objects are located in the field of coverage of the radar.

Another measurement method, mentioned in INTRODUCTION TO RADAR SYSTEMS by Merrill J. Skolnick published in 1962 by McGraw Hill Company, on page 106 thereof, consists in emitting one or more waves of closely adjacent frequencies, and, after coherent detection of the detected waves, in measuring the phase difference between these two waves. The range it is desired to determine is that proportional to the measured phase difference. Systems employing this procedure must, in order for the received signals each to be demodulated by the wave which generated it, be of the low recurrence frequency type. In other words, it is necessary to await the return of a pulse emitted at a first frequency, before emitting a pulse at another frequency.

SUMMARY OF THE INVENTION

The system in accordance with the invention does not exhibit these drawbacks. It can be applied to high recurrence frequency pulse radar systems. In this case, the signals reflected by objects are received by the system after a time interval which is substantially longer than the recurrence periodicity of the pulses. Special means make it possible to separate all the signals corresponding to one and the same object, the comparison of the phases of which signals makes it possible to determine the range of the object.

In accordance with the invention, a pulse radar system designed to provide range data, comprises a transmitter for transmitting at least two series of pulses of the same recurrence periodicity but having different carrier frequencies, means for receiving the reflected signals, means for demodulatng all the received signals by a single reference signal, in order to yield Doppler signals, Doppler filter means receiving each of the Doppler signals and supplying at separate outputs, separate signals depending upon their particular Doppler frequencies, the Doppler frequency difference between two consecutive outputs being a sub-multiple of each difference between two transmitted frequencies, individual gating means connected respectively to each of the outputs of said Doppler filter means, in order to successively pick off pairs of signals and supply them to pairs of outputs whose Doppler frequency difference is equal to the difference between two of said transmitted frequencies, and phase comparator means receiving said pairs of signals and producing signals indicative of the range of any detected object from the system.

All the received signals are thus individually analysed, enabling the system to operate correctly even in situation where a large number of objects are simultaneously present in the field covered by the radar.

Other features will become apparent in the course of the description which now follows and which is illustrated by the attached drawings.

BRIEF DESCRIPTION OF THE DRAWINGS

FIG. 3 is a diagram of a preferred example of a radar system in accordance with the invention;

Identical references designate identical elements in all the attached figures.

DESCRIPTION OF THE PREFERRED EMBODIMENT

The principle of the measurement of range by a multifrequency radar system is explained in INTRODUCTION TO RADAR SYSTEMS by Merrill J. Skolnick, page 106 thereof.

The range D of a detected object from the radar, is expressed as a function of the phase difference $\Delta\phi$ between the received echo waves, of the frequency differences $\Delta f$ between the transmitted waves, and of the velocity of light $c$.

$$D = c\, \Delta\phi/4\, \pi\Delta f$$

The measurement of the range of a detected object is therefore determined unambiguously at any rate up to a range Dmax for which the difference $\Delta\phi$ is equal to $2\pi$. Dmax is equal to half the wavelength at the frequency F2 − F1. For example, if F2 − F1 = 1000 Hz, then Dmax = 150 km. The range Dmax is referred to as the "ambiguity range". In other words, for an object located at a range of $n$ Dmax + D′, the measurement system will indicate a range $D = D'$ and there will be a condition of ambiguity. However, the ambiguity range can be made extremely long, albeit at the expense of the accuracy of measurement.

In other words, the accuracy of the range measurement, in the case of a two-frequency system, is governed by the accuracy of measurement of the phase difference. The absolute error in measurement of range is therefore proportional to the ambiguity range since the multiplicative coefficient of the difference $\Delta\phi$ is proportional to the ambiguity range:

$$D = (\Delta\phi) \times \frac{D\text{max}}{2}$$

To increase the accuracy of measurement of the range of a distant obect, without ambiguity, the measurement principle is modified in the following manner.

A first measurement is carried out based upon two very close frequencies F1 and F2, with a very long ambiguity range. The absolute error of measurement is high.

A second measurement is then carried out based upon two frequencies F2 and F3, the interval between which is for example:

$F3 - F2 = 5 (F2 - F1)$

The ambiguity range corresponding to this second measurement, is five times shorter, but the result of the first measurement makes it possible to raise the ambiguity to the level of the second. The accuracy of the second measurement is thus five times better that that of the first.

A third measurement can subsequently be carried out on the basis of two other frequencies F3 and F4 such that $F4 - F3 = 5 \times 5 (F2 - F1)$ The ambiguity of this measurement is raised by the preceding measurement and the accuracy is again multiplied by five.

Each supplementary measurement rapidly increases the accuracy and the overall ambiguity range remains the same.

This method then makes it possible to carry out high-accuracy measurements over a wide spectrum of ranges.

Figure 1:
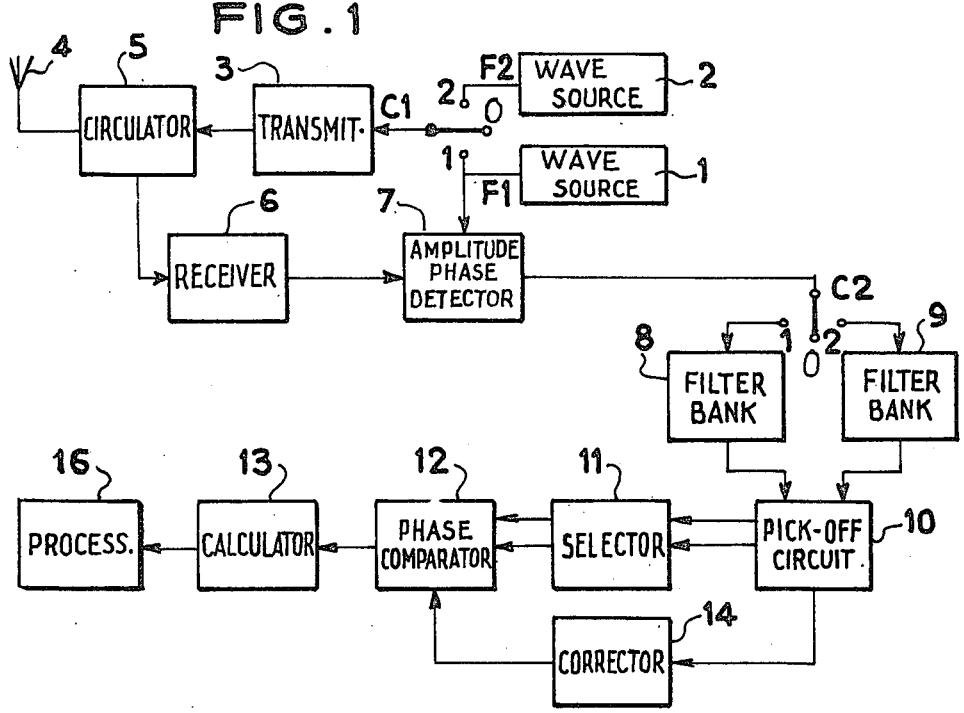
FIG. 1 is a simplified diagram of a radar system in accordance with the invention.

FIG. 1 illustrates a simplified diagram of a two-frequency radar system in accordance with the invention.

The system, at the transmitting end, comprises two sources 1 and 2 producing waves of frequencies F1 and F2 respectively; a switch C1, selecting one or the other of the sources at a predetermined rate, is coupled to a transmitter 3. The signal generated is then emitted by an antenna 4 through the medium of a circulator 5.

The emitted signal is thus a repeated sequence of two pulses having constant carrier frequencies F1 and F2. The distribution time of the pulses is determined by the switch C1.

A time shift between a pulse of carrier frequency F1 and another of carrier frequency F2 is produced at the time of emission.

The same shift is utilised at the receiving end in order to separate the two received pulses into two different processing channels and to determine the corresponding phase intervals. However, the recurrence periodicity of the emitted signal is generally small compared with the go and return time of the wave. This is the case with radars having a high recurrence frequency. The echo signals pertaining to one and the same target are characterised solely by determinate time and frequency shifts, (these being defined at the time of emission). Moreover, they have practically the same Doppler frequency if the detected object is a moving one. The detection of an object at the receiving end thus consists in recognising from amongst other and in accordance with these characteristics, the two received pulses which correspond to one and the same object.

The signal received by the antenna 4 is routed by the circulator 5 to an amplitude-phase detector 7 where it is demodulated by a single reference signal, here the signal of frequency F1. Prior to this, the receiver comprises frequency changing circuits and intermediate filter circuits represented by the circuit 6. The receiver then comprises a switch C2 and two filter banks 8 and 9. The switch C2, coupled to the detector 7, distributes the received signals between the two identical filter banks 8 and 9. With the exception of a time shift, its operation reproduces the operation of the switch C1. The filter banks 8 and 9 comprise different numbers $n$ of channels. A pick-off circuit 10 is coupled to each of the outputs of the filters 8 and 9 in order to extract from them the data pertaining to one and the same detected object. It is followed by a selector circuit 11, a phase comparator 12 which determines the phase difference $\Delta\phi$, a circuit 13 furnishing a signal which represents the range D being determined, and a processing device 16. To compensate for the time shift between the signals of frequency F1 and F2, which shift is translated by a supplementary phase shift, therefore a supplementary voltage at the output of the phase comparison, a correcting circuit 14 is provided, coupled to the comparator 12 and controlled by the circuit 10.

The operation of the system is as follows: At emission, a pair of pulses of carrier frequencies F1 and F2, are emitted with a certain time shift. At reception, and after demodulation in the amplitude-phase detector 7, the first pulse received is fed into the filter bank 8 for example, and the second into the filter bank 9. In actuality, the go and return time of the emitted wave is long compared with the recurrence periodicity, moreover the detected object is part of an assembly of objects located at different ranges which are also returning a corresponding number of pairs of pulses. It is thus impossible at reception at the switch C2, to predict if a received pulse is the echo from a pulse emitted at frequency F1 or F2, and whether it has been introduced, at reception, into the filter bank 8 or 9, because in addition the demodulating signal contains a Doppler frequency corresponding to the radial velocity of the object in relation to the radar. This indeterminacy is removed by the separation of the two pulses relating to one and the same object, and by a careful association of the signals appearing at the outputs of the Doppler filters 8 and 9.

Figure 2:
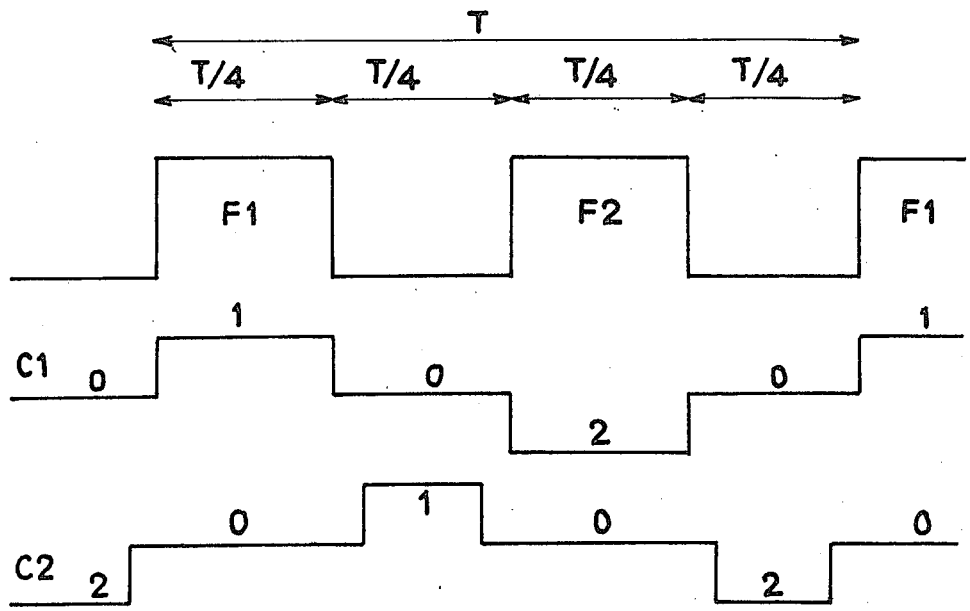
FIG. 2 is an example of the form of the transmitted signal as a function of time, and the corresponding states of the switches C1 and C2.

The form of the emitted wave is not subject to any limitation. The two pulses, for example, can be emitted one after the other at the start of a recurrence, followed by a reception period during which the switch C2 alternately routes the received signal to the filter bank 8 or the filter bank 9, in accordance with an operating cycle similar to that of the switch C1. A preferred type of operating sequence is shown in FIG. 2. The system is alternatively switched to emission and reception, during equal periods. After a pulse frequency F1, there follows a reception period, with filtering in the filter bank 8, then a pulse of frequency F2, followed by a reception period with filtering in the filter bank 9, and so on. In all cases, it is ensured that if one of the received pulses of a particular pair of pulses is introduced into one of the filter banks 8 or 9, the other pulse, pertaining to the same object, will automatically be introduced into the particular other filter bank. A system with more than two separate frequencies, would operate on the same principle, with as many filter banks and positions on the part of the switch C2, as there are emitted frequencies.

At the different outputs of the filter banks 8 and 9, only one of which outputs has been shown in the figure, there appear a whole range of signals having different Doppler frequencies. Each filter bank 8 or 9 is made up of an assembly of $n$ filters, of determinate passband widths, each characterised by a particular central frequency. Moreover, in each filter bank, the spacing of the centre frequencies of the filters is constant and the same for each bank.

In the case of the echo stemming from a pulse of frequency F1, at reception this is demodulated by the signal of frequency F1, and at the output of the detector, the signal demodulated will have a frequency $fD$, this being the Doppler frequency corresponding to the radial velocity of the detected object. This signal is routed towards one or the other of the filter banks 8 and 9; 8 for example. After processing through the circuit, the signal reappears at the output of the filter, whose passband contains the frequency $fD$. We call $j$ the order of this filter, $j$ being a whole number ranging between 1 and $n$. The echo produced by the pulse of frequency F2 will, at the output of the detector 7, have a frequency $fD + F2 - F1$, since it is demodulated by a signal of frequency F1, and will then be introduced into the filter bank 9. It will then reappear at the output of the filter whose passband contains the frequency $fD + F2 - F1$, which filter we will assume to be of order $j + k$ where $k$ is a whole number. The order shift $k$ corresponds to the frequency $F2 - F1$. Similarly, if a pulse of frequency F1 is fed into the filter bank 9, the other pulse of the pair emitted, will be introduced into the filter bank 8. The pair of signals to be picked off will appear at the output of order $i$, of the bank 8 and at the output of order $i - k$ of the bank 9 (where $i$ is a whole number ranging between 1 and $n$).

For convenience, the carrier frequencies F1 and F2 of each pulse train, are chosen so that the difference $F2 - F1$ is equal to a multiple $k$ of the spacing of the centre frequencies of the filters in each filter bank.

As a matter of fact, the passband of each filter has a width substantially equal to the interval between the centre frequencies of two consecutive filters. The frequency $fD$ has a predetermined position, in the passband of a filter, in relation to the centre frequency of said filter. If $j$ is the order of this filter, then the frequency $fD + F2 - F1$ will occupy the same position in relation to the centre frequency of the filter of $j + k$. The amplitudes of the two signals of a picked off pair, are thus equal.

This would not be the case if the number $k$ were not a whole number, because the frequency response of each filter is not necessarily linear and there would be the additional possibility of an error in the selection of the output signals from the circuits 8 and 9. In effect, the difference between the output orders of the signals of one and the same pair, is always a whole number. The value of this number is either that of the whole number closest to $k$, and less than same, or that of the whole number closest to $k$, and greater than same. There would thus be confusion at the time of pick off, and false measurements would result.

A detected object is thus wholly determined, at reception, by the presence of a signal at an output of order $j$ of one filter bank, and of a signal at the output of order $j \pm k$, of the other filter bank.

The nature of the filter banks 8 and 9 is not subjected to any limitation. These filter banks are circuits which produce a signal representative of the phaseshift between the received wave and the emitted wave, which signal is available at an output whose order represents the Doppler frequency of the detected object.

A digital filter bank containing an element for computing the Fourrier transform of the input signal, would for example be perfectly suitable for this radar system. Each computing element would have two inputs supplied in quadrature since computing is carried out in the complex plane. It would pick off a series of $n$ samples of the input signal, regularly spaced in time (for example one sample with each radar recurrence). It would then produce at the output the power spectrum of the input signal. To do this it would comprise a determinate number $n$ of outputs corresponding to $n$ filters having regularly spaced centre frequencies. Each output would in reality be a double one and be connected to a storage circuit, producing two signals which are the components of a vector whose amplitude represents the power of the echo at the frequency in question, and whose angle in relation to a fixed reference frequency represents the phase of the echo in relation to the emitted wave.

The assembly comprised by the pick off circuit 10 and selector circuit 11 analyses all the outputs in order to determine the presence of all the detected objects and to transmit the corresponding signals to the phase comparator 12. The pick off circuit 10 simultaneously picks off signals pertaining to one and the same detected object. In a first half operating cycle, it picks off the signal at the output of order $j$, of the filter bank 8 ($j = 1, 2, \ldots n$) and the signal at the output of order $j + k$, of the filter bank 9, transmitting the pair of signals to the selector circuit 11. If, in said circuit 11, the amplitudes of the two picked off signals exceed a threshold previously fixed, this indicates that an object does in fact exist. The two signals are then transmitted to the phase-comparator 12 which determines the difference between the phases, $\Delta\phi$. If, on the other hand, one of the two signals of a picked off pair, or both signals for that matter, have an amplitude or amplitudes less than the threshold of the circuit 11, the pair of signals is eliminated as not representing a detected object. The same process is repeated in the second half operating cycle by the circuits 10 and 11 at the outputs of order $i + k$, of the filter bank 8 ($i = 1, 2 \ldots n$) and order $i$ of the filter bank 9, in order to exploit all the possible paired combinations of the outputs of the filter banks.

More rigorous selection of the output signals from the filter banks 8 and 9 can be performed. For example in the first half cycle, four signals are picked off simultaneously at the outputs of order $j - k$ and $j + k$, of the filter bank 9, and those of order $j$ and $j + 2k$ of the filter bank 8. The selector circuit then only transmits the pair of signals of the output order $j$ of the filter bank 8 and the output of order $j + k$ of the filter bank 9, to the comparator, if, on the one hand, these signals exceed the threshold, and if on the other hand, there is no signal present simultaneously at the outputs of order $j - k$ of the filter bank 9 and the output of order $j + 2k$ of the filter bank 8. In other words, if a pulse of frequency F1 appears, at reception, at the output $j$ of the filter bank 8, the pulse of frequency F2 then appears at the output $j + k$ of the filter bank 9 and measurement can be carried out. However, if there is a pulse of frequency F1 at the output $j - k$ of the filter bank 9, there will also be corresponding signal at frequency F2, at output $j$ of the filter bank 8. This signal is added to the former one and the range measurement is therefor falsified. The selector circuit must eliminate this situation at the risk of losing one or more objects, because it is preferable to eliminate a real object rather than to indicate a non-existent object and range. Self-evidently, this remark also applies to the output of order $j + 2k$ of the filter bank 8, where no signal should appear since this would interfere with the assessment of the signal appearing at the output of order $j + k$, of filter bank 9. The pick off and selecting circuits 10 and 11, are described in detailed fashion in the ensuing description.

In the radar system in accordance with the invention, the two signals of a pair are not emitted simultaneously. However, after filtering they are picked off and compared simultaneously. Measurement of the phase difference must take account of the development which the phase of this signal will have undergone between the instant at which it was stored and the instant at which it is transmitted to the comparator 12. A phase-correcting circuit 14 is connected to the pick off circuit 10 and supplies the phase comparator 12 with a signal which, for each pair, depends upon the output order of the picked off signals and upon the difference between the times of storage, in the output memories of the filters, of the two signals of the pair which difference in time is equal to the repetition period of the emitted pulses.

In the previously mentioned first half cycle of pick off, let us call $\Delta\phi j$ the phase difference between the signal at the output of order $j$ of the bank 8, and the signal at the output of order $j + k$ of the filter bank 9 the first of these two signals has been stored in the filter bank 8 one recurrence more than the second output signal; the correcting circuit 14 then supplies the comparator 12 with the quantity $\Delta\phi'j$ which corresponds to the development of the phase during the time of storage of the data appearing at the output of order $j$ of the filter bank 8, for one recurrence more than the data appearing at the output of order $j + k$ of the filter bank 9. This quantity depends upon the output order of the picked off signals, that is to say upon ther Doppler frequencies. The comparator thus produces the quantity $\Delta\phi = \Delta\phi j + \Delta\phi'j$.

In the second half cycle of pick off, it will be the signal at the output of order $i$ of the filter bank 9, which will be stored for one recurrence more than the signal at the output of order $i + k$ of the filter bank 8. Let us call $\Delta\phi_i$ the phase difference between these signals. The circuit 14 then delivers a signal $\Delta\phi'i$ and the phase comparator produces $\Delta\phi = \Delta\phi i + \Delta\phi'i$. The values $\Delta\phi'j$ and $\Delta\phi'i$ will, of course, be of opposite sign and each has the same value from one cycle of pick off to the next. These correcting values are predetermined and stored before the operation of the radar system. The correcting circuit 14 is constituted by a train of $n - k$ stores each containing a signal $\Delta\phi'i$ and $n - k$ other stores containing the signals $\Delta\phi'j$, plus an assembly of contact-breakers operating synchronously with those of the pick off circuit 10 in order to transmit the content of the corresponding store to the comparator, each time a pair of picked off signals is transmitted.

Figure 3:
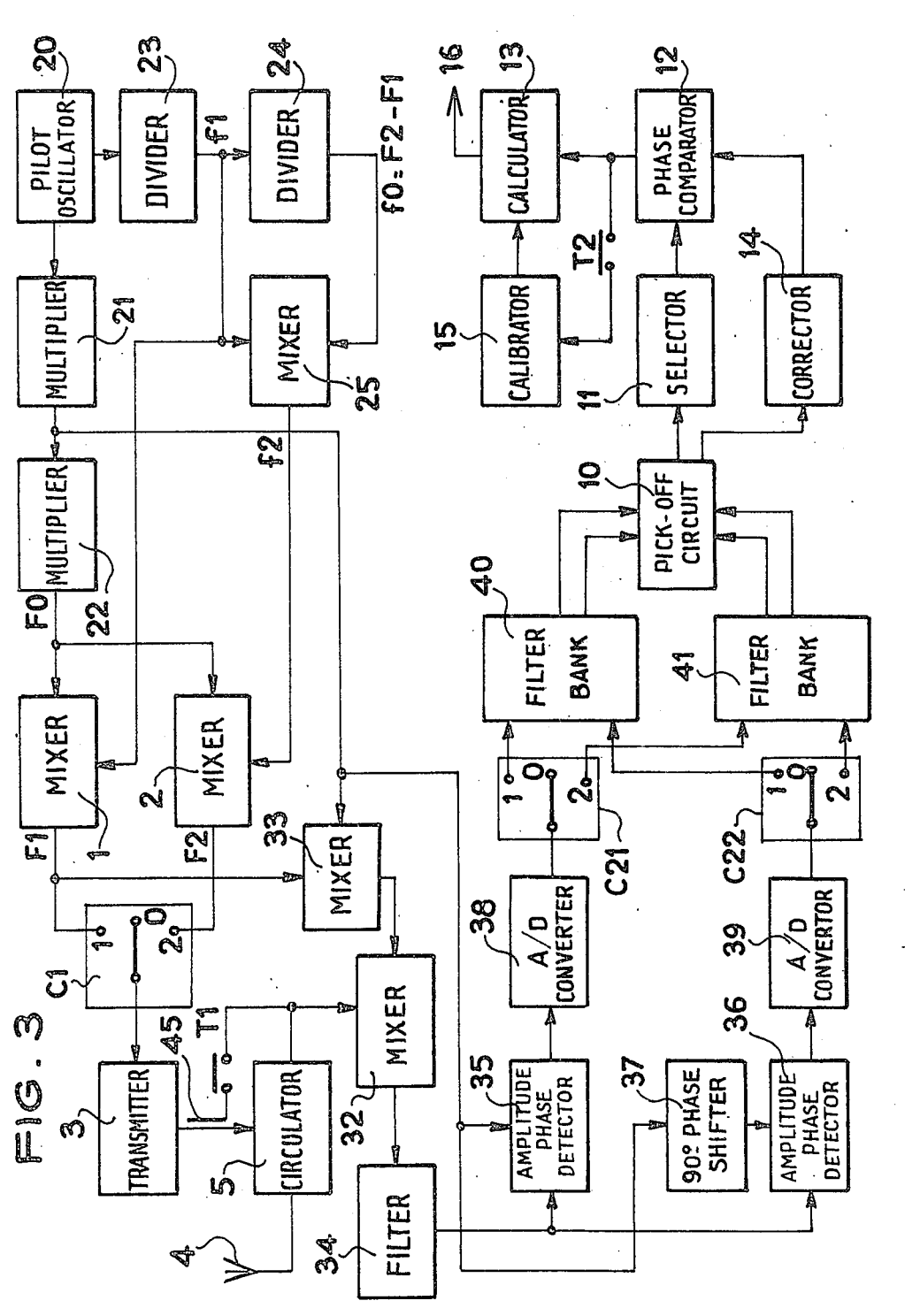

FIG. 2 illustrates an example of the form of the signal emitted, as a function of the time, and also shows the corresponding state of the switches C1 and C2, where the references 0, 1, 2 of FIGS. 1, 2 and 3 represent the different positions which the switches C1 and C2 can adopt. In FIGS. 1 and 3, the switches have been shown in position 0.

The signal emitted has a recurrence periodicity which is divided into four portions: the emission of a pulse of carrier frequency $F1$ and duration $T/4$, a reception period of less than $T/4$. This is followed by the emission of a pulse of carrier frequency $F2$ and duration $T/4$ followed by a period without emission, lasting $T/4$, containing a reception period of less than $T/4$.

The switch C1 operates in the following manner: when set to position 1, it makes a connection between the oscillator 1 and the transmitter 3 of FIG. 1, thus enables a pulse of carrier frequency $F1$ to be emitted. When set to position 2, it establishes a connection between the oscillator 2 and the transmitter, in order to emit a pulse of carrier frequency $F2$. When set to position 0, there is no connection and consequently no emission.

The switch C2 operates in the following manner: in position 0, there is no reception. In position 1, the received signal is transmitted to the filter bank 8. In position 2, the received signal is transmitted to the filter bank 9. Stagger between the operations of switches C1 and C2 ensure that the high powers developed at the transmitting end, are not introduced into the receiving circuits; C1 returns to position 0 a brief instant before C2 is set to position 2 or 1, and C2 reverts to position 0 before C1 reaches position 1 or 2.

FIG. 3 illustrates a diagram of a preferred embodiment of a radar system in accordance with the invention. The form of the emitted signal is that shown in FIG. 2.

The transmitter section comprises, as FIG. 1 shows, a source 1 which produces a wave of frequency $F1$, and a source 2 producing a wave of frequency $F2$. The pulsing of the waves is carried out by the switch C1 coupled to the transmitter 3. The signal produced by the transmitter is emitted by the antenna 4 through the medium of the circulator 5.

The system described is what is known as a "coherent" system. It comprises a pilot oscillator 20 associated with at least two frequency-multipliers 21 and 22 and two frequency-dividers 23 and 24 connected in series, the output signals from which are utilised by all the elements of the radar in order to retain phase coherence of the waves throughout the system.

In particular, in order to obtain completely stable emitted frequencies, the difference $F2 - F1$ between which is absolutely defined and constant, the frequencies $F1$ and $F2$ are obtained by frequency addition, from signals produced by the system comprising pilot oscillator, multipliers and dividers. A microwave signal $F0$ is supplied by the multiplier 22. Each source in reality a frequency adder circuit of the single side-band mixer kind, in which, through the medium of frequency $F0$, there is added another signal of lower frequency coming from the divider arrangement 23 and 24. The frequency $F1$ of the output signal from the circuit 1 is produced by the addition of the frequency $F0$ appearing at the output of the multiplier 22, and the signal of frequency $f1$ appearing at the output of the divider 23.

The frequency $F2$ of the oscillator 2 is obtained by addition of said same frequency $F0$ of the signal appearing at the output of the multiplier 22, and the frequency $f2$ of the signal appearing at the output of a mixer 25. This mixer produces at its output a signal whose frequency is the sum of the frequencies of the output signals from the divider 23 (frequency $f1$) and divider 24 (frequency $f0$). The frequency $f0$ of the output signal from the divider 24 is determinate one and equal to the difference $F2 - F1$. The frequency $f2$ at the output of the mixer 25 is thus the sum $f1 + (F2 - F1)$.

The frequency $F1$ is therefore $F1 = F0 + f1$.

The frequency $F2$ is therefore $F2 = F0 + f2$ and $f0 = f2 - f1 = F2 - F1$.

The stability of the difference therefore does not depend upon two separate oscillators. It is obtained by frequency-division from the pilot oscillator 20, a crystal-controlled type, and therefore has very high frequency stability.

By way of indication, the frequencies F1 and $F2$ are in the order of some few gigacycles. The difference $F2 - F1$, of the order of 1000 cycles per second, makes it possible to effect unambiguous range measurements up to 150 kilometers.

The receiving section, after the circulator 5, comprises a frequency-changer section with a mixer 32 and a wave source 33. A coupler 45 is arranged between the transmitter 3 and the circulator 5 and a contact breaker $T_1$ is connected between said coupler and the input of the mixer 32. The source 33 is in fact a mixer which is supplied on the one hand with the signal of frequency $F1$ and on the other with the output signal from the multiplier 21. After the mixer 32, the receiver comprises a filter circuit 34 and two amplitude-phase detectors 35 and 36. These are supplied in quadrature by a 90° phase-shift circuit 37, utilising the output signal from the divider 21. The detector 35 is followed by an analogue-digital converter 38 and a switch C21. The detector 36 is followed by an analogue-digital converter 39 and a switch C22. Each of the switches C21 and C22 is coupled to two devices 40 and 41 which compute the Fourier transform. The operation of the switches C21 and C22 is identical to that of the switch C2 in FIGS. 1 and 2. In position 0, there is no connection. In position 1, the outputs of the two circuits 38 and 39 are coupled to the device 40. In position 3, these outputs are coupled to the device 41.

The computer devices 40 and 41 are conventional digital elements, designed especially to compute the discrete Fourier transform of an input signal, in accordance with a predetermined algorythm.

The input signal of each computer device is supplied in complex form. It comprises a real part and an imaginary part which are produced respectively by the converters 38 and 39.

A number $n$ outputs supply a signal proportional to the power contained in a frequency band of given width, and representative of the phase interval between the received wave and the emitted wave.

Each computer device essentially comprises an input store, an operation store, an output store and computer means.

The outputs of each of the computer devices 40 and 41 are coupled to the pick off circuit 10. The rest of the circuit is identical to that shown in FIG. 1. The circuit 10 is followed by the selector circuit 11, then by the phase comparator 12 and the computer 13. A correcting circuit 14 is arranged between the circuit 10 and the comparator 12. A calibration circuit 15 is coupled between the output of the comparator 12, by means of a coupling element T2, and the computer 13. The output of the circuit 13 is coupled to the processing device 16, not shown in the figure.

The operation of the receiving section is as follows. The received signal undergoes frequency change in the mixer 32. This mixer is supplied with the signal produced by the circuit 33. This circuit is of the single sideband mixer kind, like the circuits 1 and 2. The received signal of intermeditate frequency is then filtered in the circuit 34. This filter is designed, for example, to eliminate the central parts of the emitter spectrum and to reduce the dynamic range of the signal transmitter to the ensuing circuits, in order to prevent them from being swamped.

The received intermediate frequency signal is demodulated in two amplitude-phase detectors supplied in quadrature from the signal furnished by the frequency-multiplier 21.

This arrangement is adopted in order for the signal to be processed by a device which computes the Fourier transform, this computing operation being carried out in the complex plane. One of the detectors 35 or 36 thus produces a "real" signal and the other an "imaginary" signal. The signals are subsequently sampled and converted to digital form in the circuits 38 and 39.

The devices $n$ computing the Fourier transform operate in the sequential fashion. They process the assembly of $n$ recurrences en bloc. To do this, they are provided with a store for recording the signals received during the $n$ recurrences. During recording, each computer device processes the signals received in the course of the preceding cycle. To do this, it has an operations store of the same capacity as the recording store. The result of the computation then appears simultaneously at the terminals of the $n$ outputs where the signals are stored and picked off during the computing operations which deal with the next cycle. A detected object is characterized at the receiving end by the presence of a pair of signals whose characteristics have been enunciated in the context of the description of FIG. 1.

In order that the system shall operate correctly, the repetition frequency of the emitted pulses is chosen equal to a multiple of the frequency difference $F2 - F1$. Moreover, the repetition frequency of the recording and operations cycle of the computer devices, is made equal to a sub-multiple of this frequency difference in order that the output signal from the comparator 12 shall contain no modulation whose frequency is equal to $F2 - F1$. To do this, a general radar synchronising device, not shown in the figures, is responsible for the simultaneous control, amongst others of the switches C1, C21, C22 and the computer devices 40 and 41. The control signals which supplies to these elements, are derived from the signal furnished by the oscillator 20 in order at all times to respect the coherence conditions enumerated hereinbefore. A synchronising device of this kind, comprising in particular forward-counting and/or backward-counting circuits, can readily be designed by any person skilled in the art and, consequently, requires no further detailed description here.

Figure 4:
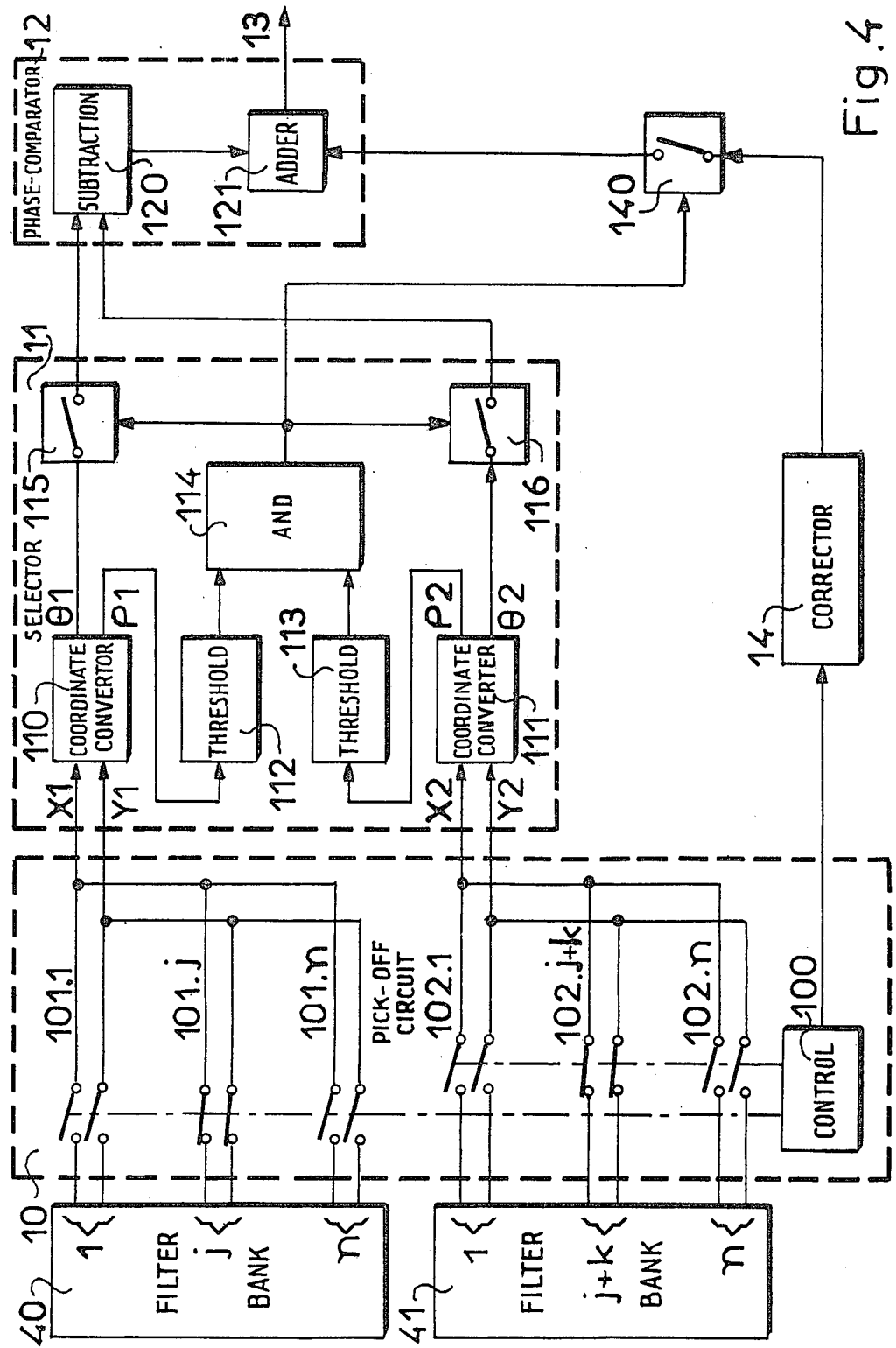
FIG. 4 is a detailed diagram of pick-off and selection devices.

The pick off 10 and selector 11 circuits which are peculiar to the invention, are shown in FIG. 4. The computer elements 40 and 41 are indicated symbolically simply by three pairs of outputs, in order not to uselessly overburden the figure. Only the first and $n^{th}$ outputs of each of them have been shown, the $j^{th}$ output of the device 40 and the $(j + k)^{th}$ of the device 41. The pick off device 10 comprises gating means which are split into two groups.

The first group comprises $n$ pairs of gates connected to $n$ pairs of outputs of the computer device 40. These gates are represented by 101.1 . . . , 101.$j$ connected to the output of order $j$ and 101.$n$.

The second group likewise comprises $n$ pairs of gates connected to $n$ pairs of outputs of the computer device 41, represented by 102.1, . . . 102.$j + k$, . . . 102.$n$. The gates of the pick off circuit are controlled by a control circuit 100 which itself receives control signals from the general synchronising device of the radar, hereinbefore referred to but not shown in the figures. This control circuit orders the successive transfer of the signals appearing at the outputs of the filter banks, to the selector circuit, in the manner hereinbefore described.

All the outputs of the first gates of each pair of the first group, are connected in parallel to a first input marked X1, of a circuit 110. The outputs of the second gates of each pair of the first group, are connected in parallel to a second input marked Y1, of the circuit 110.

Similarly, for each pair of the second group, the outputs of the first gates are connected in parallel to a first input marked X2, of a circuit 111 and the outputs of the second gates connected in parallel to a second input, marked Y2 of said circuit 111. The circuits 110 and 111 included in the selector circuit 11, are designed to convert cartesian coordinates into polar coordinates, transforming a pair of X, Y signals into a pair of $\rho$, $\theta$ signals. In the case of the present radar system, X1, Y1 represent the two components, in the complex plane, of the signal picked off at an output of the device 40, of which $\rho1$ and $\theta1$ are respectively the modulus and the argument. The same applies to X2 and Y2, which are transformed into $\rho2$ and $\theta2$. The signals $\theta1$ and $\theta2$ are applied to the comparator 12 through the gates 115 and 116 respectively. These gates are designed to permit transfer of the signals $\theta1$ and $\theta2$ purely when the signals $\rho1$ and $\rho2$ exceed a predetermined threshold. To do so, these signals are applied to threshold detectors 112 and 113 respectively, whose outputs are connected to an AND-gate 114. The output of the AND-gate 114 is coupled to the control inputs of the gates 115 and 116. The phase-comparator 12 comprises a subtractor circuit 120 supplying $\theta2 - \theta1$ and an adder circuit supplying $\theta2 - \theta1 + \Delta\phi'$. The signal $\Delta\phi'$ is furnished by the correcting circuit 14, through a gate 140 likewise controlled by the output circuit from the gate 114. All the circuits utilised in the systems 10, 11, 12 and 14 are digital design. The computer circuit 13 (FIG. 3) is a multiplier circuit which, after each operations cycle of the devices 40 and 41, produces a train of signals representative of the range of objects in space, travelling at difference velocities. For a single object, the range signal appears in sampled form. The processing device 16 can be constituted by a cathode-ray tube whose beam has a horizontal scan function synchronised with pick off, the output signal of the circuit 13 being applied to the vertical deflection plates: on the screen, a set of light spots are obtained whose coordinates respectively indicate the velocity and range of the detected objects.

In the circuit just described, the echo signal corresponding to an emitted pulse of frequency $F1$ does not follow the same channel as the echo signal corresponding to an emitted pulse of frequency $F2$. The general result is that the phase-shifts experienced by these signals are not the same in transit through one channel, as they are in transit through the other, and this constitutes a nuisance as far as range measurment is concerned. However, this discrepancy between the phase-shifts introduced, can be measured by the system itself, stored in the calibrating circuit 15, and used to correct the computation of the range in the circuit 13. To do this, it is merely necessary to successively supply two pulses, one at the frequency $F1$ and the other at the frequency $F25$ directly from the transmitter into the receiver. The system then stimulates an echo at zero range; it computes the Fourrier transform of the pulse responses for each channel and the measured phase-shift values are stored in order to correct the values of $\Delta\phi$ obtained during the ensuing detection cycles.

Calibration is carried out by means of a set of coupling elements, namely a coupler 45 arranged between the transmitter 3 and the circulator 5, and contact breakers T1 and T2. The operating cycle of the switch C1 is then instantaneously modified in order to be identical with that of the switch C2 in FIG. 2. During a first recurrence, the gate T1 is open, once during the emission of a pulse of frequency $F1$, and a second time during the emission of a pulse of frequency $F2$. The signals transmitted to the receiver are sampled and stored in the recording store of the devices 40 and 41. During the $n-1$ following recurrences, the gate T1 remains closed and the recording stores receive no signal. At the end of the cyle of $n$ recurrences, the devices 40 and 41 supply the Fourrier transform of the signal, the phase-measurement is carried out, and the results transmitted to the circuit 15 through the medium of the gate T2. The correcting term stored in the circuit 15 is valid for all real measurements, which follow the calibration of the system. For this purpose, the range computer circuit 13 comprises a subtractor circuit which deducts from every range measurement, the correcting term stored in the circuit 15. In view of the small variation in this correcting term, as a function of time, the calibration cycles can be spaced out in time.

The system described will advantageously be used to complement an existing radar system. Measurement can be carried out when the radar is on watch. The accuracy of measurement is improved if at least three different frequencies are emitted. The system then comprises at least three linear filter channels.

The system in accordance with the invention can also be used to complement some other measurement system which will thus be rendered even more accurate by the removal of ambiguities.

The invention applies to any radar system involved with range measurement. It applies, more generally, to any measurement of large distances.

What is claimed is:

1. A pulse radar system designed to provide range data, comprising a transmitter for transmitting at least two series of pulses of the same recurrence periodicity but having different carrier frequencies and a receiver comprising:

means for demodulating all the received signals by a single reference signal, in order to yield Doppler signals;

at least one bank of $n$ Doppler filters each receiving said Doppler signals and supplying at $n$ separate outputs, separate signals depending upon their particular Doppler frequencies, the interval between the centre frequencies of the filters in each bank being constant and equal to a sub-multiple of each difference between two emitted frequencies;

switching means respectively connected to each of the filter outputs, in order to succesively pick off pairs of signals to pairs of outputs whose Doppler frequency difference is equal to the difference between two of said transmitted frequencies;

and a phase-comparator for comparing the signals of each pair picked off and producing said range data.

2. A radar system as claimed in claim 1, wherein selector means are arranged between said switching means and said comparator, for transmitting the pairs of signals picked off, solely in the case where each of said signals of said pair has an amplitude in excess of a predetermined threshold.

3. A radar system as claimed in claim 2, emitting pulses at a high recurrence frequency, the carrier frequency of the pulses alternately having a first value $F1$ and a second value $F2$, comprising two identical filter banks and a switch for applying the demodulated signals alternately to the first and to the second filter banks, with the same recurrence frequency as exhibited by the emitted pulses; and wherein said switching means comprise a first series of gates connected to the outputs of the first filter bank for successively picking off the first signals of each pair, and a second series of gates connected to the outputs of the second filters bank for successively picking off the second signals of each pair.

4. A system as claimed in claim 3, wherein said filter banks are of the type constituted by devices for calculating the Fourrier transform, and are supplied with two demodulated signals, in quadrature, possessing furthermore $n$ pairs of outputs, wherein each series of gates of the switching means comprises $n$ pairs of gates, the outputs of the first gates of each pair of the first series being connected in parallel to a first output terminal, the outputs of the second gates of each pair being connected in parallel to a second output terminal, and the first and second gates of each pair of the second series being connected in parallel respectively to a third and fourth output terminal, these output terminals being coupled to said selector means.

5. A system as claimed in claim 4, further comprising a device for controlling the gates, in order to simultaneously operate the two gates coupled to the output of order $j$ ($j = 1, 2 \ldots n$) of the first filter bank on the one hand, and the two gates coupled to the output of order $j \pm k$ of the second filter bank, on the other, the difference of order $k$ corresponding to a Doppler frequency difference between the demodulated signals, equal to the difference between the emitted frequencies $F1$ and $F2$.

6. A system as claimed in claim 5, wherein said selector means comprise a first device for converting cartesian coordinates into polar coordinates, connected to the two first output terminals of the switching means receiving the first picked off signal, a second identical device for converting coordinates, connected to the third and fourth output terminals of such switching means, each of said converters having an output for the modulus and one for the argument, two threshold detectors connected to the "modulus" outputs of said converters, and AND-gate with two inputs connected to the outputs of two detectors, and two gates connected respectively to the "argument" outputs of said converters, each having a control input connected to the output of said AND-gate and the outputs of said gates being coupled to the phase-comparator.

7. A system as claimed in claim 5, further comprising a phase-correcting circuit for storing predetermined phase-shift values, connected between said switching means and the phase-comparator.

8. A system as claimed in claim 1, further comprising a range computer circuit coupled to the output of the phase comparator, a set of coupling elements between the transmitter and the receiver, for performing the simulation of a zero range echo, and a calibrating circuit for storing the range signal received during said simulation; and wherein said computer circuit comprises a subtractor circuit for deducting from any range measurement, the value of the signal stored in said calibrating circuit.

* * * * *